United States Patent [19]
Dobler et al.

[11] Patent Number: 4,976,160
[45] Date of Patent: Dec. 11, 1990

[54] PROCESS FOR CONTACTLESS MEASUREMENT OF MECHANICAL STRESS AND DEVICE FOR CARRYING OUT THE SAME

[75] Inventors: Klaus Dobler, Gerlingen; Hansjörg Hachtel, Weissach; Georg Zimmermann, Gerlingen, all of Fed. Rep. of Germany

[73] Assignee: Robert Bosch GmbH, Stuttgart, Fed. Rep. of Germany

[21] Appl. No.: 314,575

[22] PCT Filed: Jun. 5, 1987

[86] PCT No.: PCT/DE87/00258
§ 371 Date: Jan. 20, 1989
§ 102(e) Date: Jan. 20, 1989

[87] PCT Pub. No.: WO88/00690
PCT Pub. Date: Jan. 28, 1988

[30] Foreign Application Priority Data
Jul. 23, 1986 [DE] Fed. Rep. of Germany ....... 3624846

[51] Int. Cl.$^5$ .................................................. G01L 3/10
[52] U.S. Cl. ..................................... 74/862.36; 73/779
[58] Field of Search ................ 73/862.36, 779, 862.69, 73/DIG. 2; 324/209

[56] References Cited

U.S. PATENT DOCUMENTS
2,365,073 12/1944 Haight .
2,557,393 6/1951 Rifenbergh .

FOREIGN PATENT DOCUMENTS
1900194 7/1970 Fed. Rep. of Germany .
3437379 4/1985 Fed. Rep. of Germany .
169326 1/1945 Japan ................................. 73/862.36

OTHER PUBLICATIONS

J. Yamasaki et al., "Torque Sensors Using Wire Explosion Magnetoelastic ... ", IEEE Trans. Magn., Mag. 22, No. 5, Sep. 1986, pp. 403–405.
Patent Abstracts of Japan, vol. 10, No. 19 (P-423)(2076), 1/24/86, Tokyo, JP, (Mitsubishi Denki K.K.), Yoshio, Sekine.
Patent Abstracts of Japan, vol. 11, No. 177 (P-583)(2624), 6/6/87, Tokyo, JP, (Aisin Seiki Co. Ltd.), Takehiko, Fushimi.
Patent Abstracts of Japan, vol. 10, No. 154 (P-463)(2210), 6/4/86, Tokyo, JP. (Nissan Jidosha K.K.), Tooru, Kita.

*Primary Examiner*—Charles A. Ruehl
*Attorney, Agent, or Firm*—Michael J. Striker

[57] ABSTRACT

Two regions (11, 12) of a shaft (10) are coated with a film which is free of prestress and consists of magnetoelastic Fe/Ni material. The films have a stripe pattern arranged respectively at angles of +45° and −45°. The change in permeability of these films is a function of the mechanical stress of the shaft (10), particularly of the torsion, and is detected by means of sensor arrangements (13 and 14). A characteristic line for the mechanical stress which extends linearly over the entire range of measurement is made possible by means of an evaluating circuit (22) of the measured voltages.

18 Claims, 2 Drawing Sheets

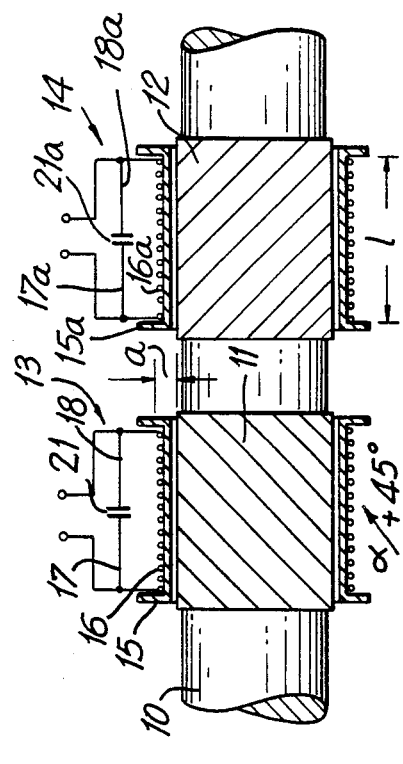
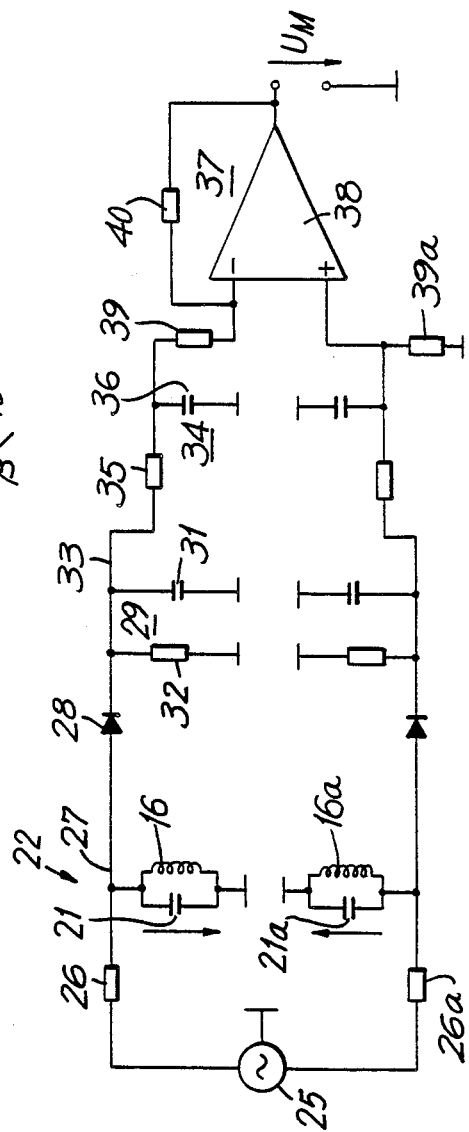
FIG.1
FIG.2

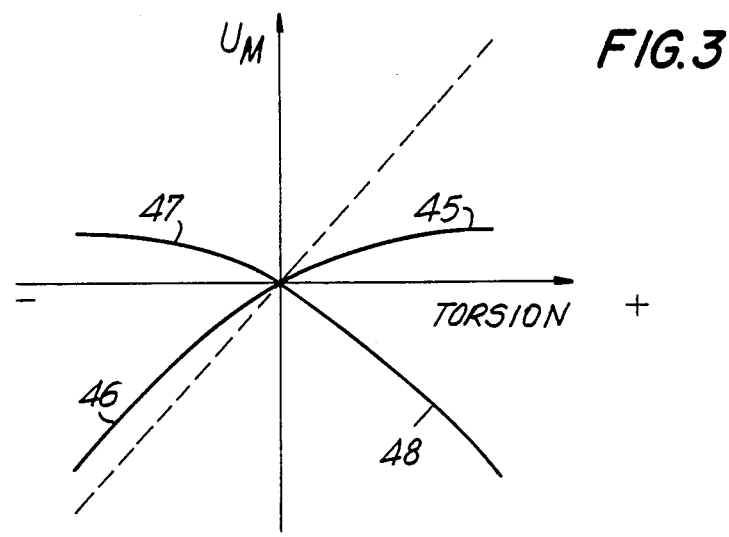
FIG.3
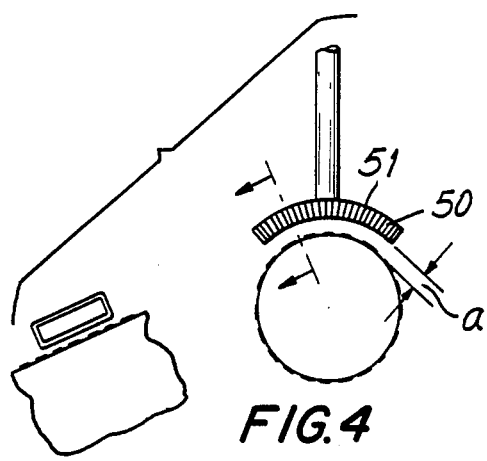
FIG.4
FIG.5
FIG.6
FIG.7
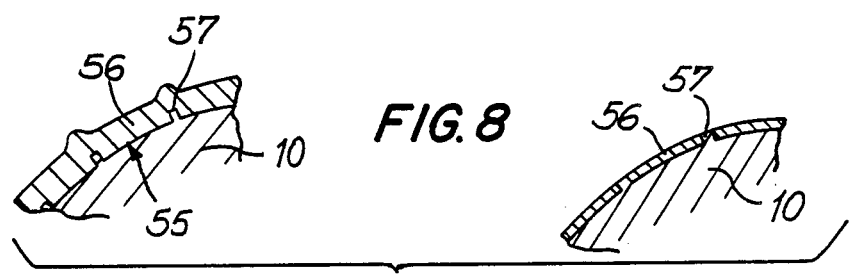
FIG.8

PROCESS FOR CONTACTLESS MEASUREMENT OF MECHANICAL STRESS AND DEVICE FOR CARRYING OUT THE SAME

BACKGROUND OF THE INVENTION

The invention is based on a device for measuring torsion or bending force exerted or an object. It is known that ferromagnetic materials change their permeability in the direction in which tensile or compressive forces act. This change in permeability is detected in a contactless manner by a sensor coil If amorphous metals are used as materials, they can be glued or welded on only in the form of foils In so doing, it is difficult to achieve a high adhesive strength or creep resistance of the material on the object to be measured In addition, the crystallization threshold is easily exceeded when the amorphous metals are welded on, so that its structural state changes in partial areas and there is no longer any accurately definable material state. In addition, a measurement curve extending in a linear manner along the entire measurement region can no longer be achieved, even when the coating is applied to the shaft with prestress in a relatively complicated manner for this purpose. Particularly in the edge areas, the measurement curve diverges sharply from a straight line, so that only a very small measurement region can be evaluated. Moreover, the finishing process necessary for this is costly and difficult to carry out. A first film must be applied to a shaft which is twisted to the left and the other film must be applied to a shaft twisted to the right, or vice versa. In so doing, the prestressed surface portions work linearly only in a narrow measurement region, so that only a relatively small portion of the available measurement region can be utilized.

SUMMARY OF THE INVENTION

In contrast, the device, according to the invention, has the advantage that the film can be applied to the object to be measured with high adhesive strength and creep resistance in a simple and inexpensive manner No prestressing is necessary A characteristic line extending linearly for the entire range of measurement can be obtained by means of an evaluating circuit. A relatively simple installation of the sensors is also possible on objects with a complicated and poorly accessible construction by means of coils covering the films on one side of the object to be measured until the edge areas. Since the coils detect relatively many formed anisotropic regions simultaneously, a so-called average value is formed already by means of the coils themselves. The winding shape can be adapted to the respective measurement problem in a simple and economical form. The economical film technique (thin-film or thick-film technique) can be used for applying the coil.

In keeping with these advantages and others which will become apparent hereafter, one feature of this invention resides in the provision of two coatings of magnetoelastic material applied side by side on surface regions of the object to be measured, the coatings being free of prestress and each consisting of parallel stripe-shaped zones whereby the zones of one coating are oriented substantially at right angles to the zones of the other coating, two parallel resonant circuits each including a coil wound on an assigned coating, and a capacitor, and means for exciting the resonant circuits to produce a measuring voltage when the object is subjected to a mechanical stress.

BRIEF DESCRIPTION OF THE DRAWING

An embodiment example of the invention is shown in the drawing and described in more detail in the following description.

FIG. 1 shows a magnetoelastic torsion sensor;

FIG. 2 shows a circuit arrangement, according to the invention, for operating the magnetoelastic sensors according to FIG. 1;

FIG. 3 shows a diagram which shows the measurement voltage over the applied torsion;

FIGS. 4 to 7 show a modification of a detail, in each instance; and

FIG. 8 shows a partial step of a production process.

DESCRIPTION OF THE PREFERRED EMBODIMENT

In FIG. 1, a shaft is designated by 10, the twisting of the shaft 10 is to be determined by means of the torsion measuring device of this invention. Two coatings 11, 12 of highly magnetoelastic material, whose permeability changes as a function of the stress exerted on the shaft 10, are applied side-by-side to the shaft 10. When the shaft 10 is twisted two main stress directions, which intersect at 90°, occur when the twisting is within elastic limit. The tensile stress acts along the line $\alpha$ and the compressive stress acts along the line $\beta$ at the same magnitude in each instance. In ferromagnetic materials, the permeability increases, e.g. along line $\alpha$, whereas it decreases along line $\beta$, or vice versa. If a stripe pattern is formed in the coatings at an angle of $+45°$ and $-45°$, respectively, relative to the axis of symmetry, i.e. relative to the shaft axis, a signal is included in coils 16, 16a which is a function of the direction of the stripes. In order to reduce the zero point drift, the two coils are connected in a Wheatstone half-bridge. In so doing, the respective coils cover stripe zones which are offset by 90° relative to one another.

For the purpose of detecting the change in permeability, a sensor arrangement 13, 14 is assigned to each coating 11, 12. The sensor arrangements 13, 14 are identically constructed and consist of coil carriers 15 15a on which the coils 16 and 16a are wound. The coils 16 and 16a are to be arranged, if possible, at a slight distance "a" above to the surface of shaft 10. The connections 17, 18 and 17a, 18a of the coils 16 and 16b are connected with capacitors 21 21a which form parallel resonant circuits with the respective coils. The parallel resonant circuits of the two sensor arrangements 13, 14 are connected in an electric evaluating circuit 22 which is shown in more detail in FIG. 2.

The evaluating circuit 22 is shown as a difference circuit for the two sensor arrangements 13, 14. Both branches of the evaluating circuit 22 consist of identical structural component parts. An alternating voltage generator 25 feeds the resonant circuits 16, 21 and 16a, 21a with alternating voltage. Each parallel circuit is connected to the alternating voltage generator 25 via a series resistor 26 or 26a. A sensor signal 27 can be taken off at the sensor coil 16. The sensor signal 27 is supplied via a diode 28 and a filter circuit 29, consisting of a filter capacitor 31 and a bleeder resistor 32. The filtered signal voltage 33 reaches an amplifier arrangement 37 via a low-pass arrangement 34 which is formed from a resistor 35 and a capacitor 36. The amplifier arrangement 37 is constructed as an inverting operational amplifier circuit 38 whose amplification factor is adjustable with the two resistors 39, 40. The sensor signal of the coil 16 is fed to the inverting input of the operational amplifier 38, and the sensor signal of the second coil 16a is fed to the noninverting input of the operational amplifier 38.

The magnetic alternating field generated by the current-carrying coils 16 or 16b of the sensor arrangement 13 or 14 enters the shaft 10, so that the electrical properties of the resonant circuit 16, 21 or 16a, 21a are influenced by the coatings 11 and 12, respectively, of the shaft 10. First, the permeability of the coatings 11, 12 of the shaft 10 determine the inductance of the coils 16 or 16a. Since, as already mentioned above, the permeability of ferromagnetic materials changes under tensile or compressive stresses, into which a torsional stress can be split up, as known, the mechanical stress state of the shaft 10 can be measured in a contactless manner. In addition, the inductance of the coil 16 or 16a is a function of the distance of the coil 16 from the surface of the shaft 10 in the regions 11, 12. Therefore, the distance "a" should preferably be as small as possible in order to achieve a high signal.

However, the magnetic properties of the coil 16 or 16a are additionally determined by a second effect. The magnetic alternating field induces eddy currents in the surface of the shaft 10 in the regions or coatings 11, 12, which lower the inductance. Also, the influence of the eddy currents is a function of the distance a of the coil 16 from the surface of the coatings 11, 12. The two effects increase as the distance "a" becomes smaller. As a result of the stripe pattern of the coating 11, a change in the magnetoelastic effect acting on the coil 16 results when a torque to the right acts on the shaft 10. In so doing, the component depending on tensile stress increases and the component depending on compressive stress decreases. The stripe pattern consists of zones which are separated from one another by means of thin grooves or webs. The diagram according to FIG. 3, shows the measurement voltage $U_M$ over the torsion applied to the shaft 10. The curves 45, 46 drawn in the quadrants I and III show the course of $U_M$ across the coil 16. A tendency toward sensitivity reduction can be detected as the twisting increases. The curve 45 in quadrant I refers to right-hand torsion and the curve in quadrant III shows the relation during left-hand torsion. As the torsional stress increases a pronounced increase in sensitivity results chiefly during small torques. The curves 47 and 48 drawn in the quadrants II and IV show the measurement voltage occurring across the coil 16a of the second sensor arrangement 14, which curves are formed in a mirror-inverted manner relative to curves 45 and 46. The two curves 45, 46 and 47, 48, respectively, although not uniformly curved, extend in opposite directions. However, when subtracted in evaluating circuit 22, as shown in FIG. 2, they result in a practically linear measurement curve, as indicated by dashed line in FIG. 3. The cause of these curve configurations is the configuration of the magnetoelastic sensitivity characteristic line of the permalloy material of the regions 11, 12, which varies respectively during tensile and compressive stress.

In many cases, e.g. with small construction space or poor accessibility, it is often not possible to arrange ring-shaped coils 16 around the shaft 10. As shown in FIG. 4, the coils 50 are arranged on only one side of the shaft 10, so that they cover only a partial area of the regions 11, 12. The distance a of the coil 50 from the surface of the regions 11, 12 is preferably constant. The coil carrier 51 must thus have a radius of curvature whose center lies on the axis of the shaft 10. For this purpose, the coil 50 is wound around the coil body 51 in the longitudinal direction of the axis of the shaft 10. A winding of the coil 50 accordingly covers, along its entire length, a plurality of stripe patterns arranged in the coatings 11, 12, so that an average value is formed on the basis of the summary, virtually equivalent detection of many zones simultaneously. Errors caused e.g. by the transitions to the individual stripes are reduced by means of the simultaneous detection of a plurality of zones by means of the magnetic alternating field of the coil 50. Additional errors, particularly the temperature drift, are reduced by means of the difference circuit connection of the two coils in the evaluating circuit 22 as a result of the compensating effect. The coil 50 can also be wound in the axially transverse direction, that is, so as to be offset by 90° relative to the winding direction shown in FIG. 4. However, it is also possible to design the coil 50 on the segmented coil body 51 so as to be rectangular or oval, as shown in FIGS. 5 and 6. It is also conceivable to arrange a plurality of e.g. circular coils 53 in a series connection on the inside of the coil body 51.

The production of wire-wound coils 50, whose shape must be adapted for the purpose of a constant distance from the shaft surface, is relatively costly. However, the coils can also be applied in an electrochemical manner, e.g. etched or electroplated on, or applied by means of a pressure or vacuum evaporation process.

In order to apply the magnetoelastic film to the shaft 10, it is particularly advantageous to roughen the surface of the shaft 10 or prepare it chemically. Next, a Fe/Ni film (permalloy) with a composition of 45/55% is applied by means of electroplating or plasma spraying. In order to additionally increase the adhering strength of the film on the shaft, a bonding film with a thickness of approximately 2 μm can be applied. The zones which are oriented at 45° are then distributed along the entire circumference by means of a tool, e.g. a pointed tool. With an axial coating length of e.g. $l \approx 12$ mm, the zone width should be approximately $c \approx 1$ mm and the width of the engraved groove should be $d \approx 0.1$ mm.

It has also proven particularly advantageous if a relief-type stripe pattern 55 is produced on the shaft 10, as shown in FIG. 8, by means of a machining process or a process without cutting. Next, the surface is completely coated with a magnetic film 56 by means of electroplating, plasma spraying or another process. In order to obtain the desired mutually separated zones again, the relief is then removed by machining or by a process not involving cutting until the projecting places 57 on the shaft project out and serve as a separation between the magnetic film in the recesses.

The proposed device can be used particularly when the torsion must be measured under extremely confined conditions. Because of the extremely simple and inexpensive construction of the device, it is also suited particularly for large-series applications, e.g. in a motor vehicle as a sensor for the electric steering aid.

We claim:

1. Device for contactless measurement of mechanical stresses which are exerted on a rotating or stationary object to be measured, comprising at least two regions on the surface of the object (10) to be measured which comprise a coating of a magnetoelastically sensitive material whose permeability changes as a function of stress, and at least one sensor arrangement (13, 14) assigned to each of these regions (11, 12), each sensor arrangement (13, 14) including a parallel resonant circuit having a coil and a capacitor, an oscillator (25 for energizing said parallel resonant circuits to induce alternating magnetic fields in respective coils, said coatings being applied without prestressing and each having a grooved pattern which is oriented at +45° and −45° relative to an object axis respectively, and an electric evaluating circuit (22) for evaluating signals across said resonant circuits to produce an output voltage ($U_M$) which is a measure of the mechanical stress exerted on said object.

2. Device according to claim 1, wherein said oscillator energizes said resonant circuits via series resistors, the resistance values of the series resistors, the inductances and ohmic resistance values of the sensor coils, the capacitance of the capacitors, and the frequency of the alternating voltage being adapted to one another and to the grooved pattern of the coatings in such a way that a linear characteristic line of the output voltage results.

3. Device according to claim 2, characterized in that the sensor coils (16 and 16a) at least partly cover the corresponding coatings (11, 12), and in that the sensor coils are at a constant distance (a) above the surface of the regions (11, 12) along the entire length and width of the coils.

4. Device according to claim 1, characterized in that the object is a shaft and the coils are wound in the direction of the shaft axis.

5. Device according to claim 4, characterized in that the geometry of the coils is circular, oval or rectangular.

6. Device according to claim 5, characterized in that a plurality of coils are connected in series for each sensor arrangement (12, 13).

7. Device according to claim 1, characterized in that the magnetoelastic coatings preferably consist of a Fe-Ni alloy with a mixture ration of 45/55.

8. Device for contactless measurement of mechanical stresses which are exerted on an object, comprising two coatings of magnetoelastic material applied side by side on surface regions of said object, said coatings being free of prestress, and each consisting of parallel stripe-shaped zones, the zones of one coating being oriented substantially at right angles to those of the other coating, two parallel resonant circuits each including a sensor coil wound on an assigned coating, and a capacitor, means for exciting said resonant circuits, and means for adding electrical signals across said resonant circuits to produce a measuring voltage when the object is subjected to a mechanical stress.

9. Device as defined in claim 8, wherein said exciting means includes a source of alternating voltage connected to the respective resonant circuits via series resistors.

10. Device as defined in claim 9, wherein the resistance of said series resistors, the inductance and ohmic resistance of said coils, the capacitance of said capacitors, and the frequency of the alternating voltage source are adapted relative to each other such as to produce a measuring voltage having a substantially linear characteristic.

11. Device as defined in claim 8, wherein said stripe-shaped zones are separated one from each other by thin grooves or webs.

12. Device as defined in claim 8, wherein said object to be measured is a shaft subjected to torque.

13. Device as defined in claim 12, wherein the stripe-shaped zones in respective coatings are inclined at angles of 45° and −45° relative to the shaft axis.

14. Process for contactless measurement of mechanical stresses which are exerted on a rotating or stationary object to be measured, comprising the steps of applying on at least two regions of the surface of an object (10) to be measured a coating of a magnetoelastically sensitive material whose permeability changes as a function of stress, said coatings being applied without prestressing and each having a grooves pattern which is oriented at +45° and −45° relative to an object axis, respectively; and assigning to each of these regions (11, 12) at least one sensor arrangement (13, 14) each including a parallel resonant circuit having a coil and a capacitor; energizing said parallel resonant circuits by an oscillator (25) to include alternating magnetic fields in respective coils; and evaluating signals across said resonant circuits to produce an output voltage ($U_M$) which is a measure of the mechanical stress exerted on said object.

15. Process according to claim 14, characterized in that a relief texture corresponding to the desired grooved pattern is produced in wall regions of an object (10) to be measured, in that a film which is free of prestressing and consists of magnetoelastic material is applied to said wall regions of the object (10), which film completely covers the relief texture, and in that the film is removed until the maximum height of the relief.

16. Process according to claim 15, characterized in that the film is removed by means of machining.

17. Process according to claim 14, characterized in that wall regions of an object (10) to be measured is roughened, in that a film which is free of prestressing and consists of magnetoelastic material is applied to the roughened wall regions, and in that the desired grooved pattern with the smallest possible spacing is then produced with the aid of a pointed tool.

18. Process according to claim 17, characterized in that a thin bonding film is applied after roughening the wall of the object (10) to be measured.

* * * * *